US006624996B2

(12) United States Patent
Theaudiere et al.

(10) Patent No.: US 6,624,996 B2

(45) Date of Patent: Sep. 23, 2003

(54) SAFETY DEVICE APPLIED TO ENGAGING AND DISENGAGING A FUSE IN MEDIUM VOLTAGE ELECTRICAL GEAR

(75) Inventors: Bruno Theaudiere, Lunel (FR); Lucien Sannino, Juvignac (FR)

(73) Assignee: Alstom, Paris (FR)

( * ) Notice: Subject to any disclaimer, the term of this patent is extended or adjusted under 35 U.S.C. 154(b) by 43 days.

(21) Appl. No.: 09/995,579

(22) Filed: Nov. 29, 2001

(65) Prior Publication Data

US 2002/0066655 A1 Jun. 6, 2002

(30) Foreign Application Priority Data

Dec. 1, 2000 (FR) .......................................... 00 15576

(51) Int. Cl.[7] .................................................. H02H 5/12

(52) U.S. Cl. ...................................................... 361/104

(58) Field of Search ................................. 361/104, 115

(56) References Cited

U.S. PATENT DOCUMENTS 3,400,353 A 9/1968 Schockelt
3,909,762 A * 9/1975 Wilks et al. .................. 337/4
4,240,122 A 12/1980 Smith
4,484,044 A * 11/1984 Yoshigae ....................... 218/3
5,594,610 A 1/1997 Robirds et al.

FOREIGN PATENT DOCUMENTS

DE 19918077 C1 11/2000
EP 0070794 A2 1/1983

* cited by examiner

*Primary Examiner*—Gregory J. Toatley, Jr.
*Assistant Examiner*—Boris Benenson
(74) *Attorney, Agent, or Firm*—Sughrue Mion, PLLC

(57) ABSTRACT

The safety device comprises an electric circuit comprising at least a current-limiting fuse and a current switch connected in series with the fuse. The switch has a moving contact which can be actuated by a drive mechanism to open or close the switch. The mechanism is arranged so as to prevent the fuse(s) being disengaged or engaged while the switch is closed and it has a drive lever occupying a first position or a second position respectively when the switch is closed and when it is open. Each fuse has a handle member which is either masked or uncovered depending on the position of the lever, the lever being designed to cover the handle member so as to mask it.

11 Claims, 5 Drawing Sheets

SAFETY DEVICE APPLIED TO ENGAGING AND DISENGAGING A FUSE IN MEDIUM VOLTAGE ELECTRICAL GEAR

The invention relates to safety in electrical gear, and more particularly in air-insulated medium voltage switching kiosk substations that include current-limiting fuses.

BACKGROUND OF THE INVENTION

Such kiosks are generally placed outside on a mount and they are used for distributing electricity at a voltage of less than 52 kV, which corresponds to the upper limit for medium voltage as standardized at the date of this application. It is not impossible that as fuse technology advances the voltages used in air-insulated switching kiosks will in the future exceed this value, in which case the invention will continue to apply in like manner to a range of voltages above 52 kV.

In such kiosks, each electricity feed bar is connected to an electricity distribution cable via a current-limiting fuse or a plurality of fuses placed side by side and connected in parallel in the circuit. Each fuse is said to be “engageable”, i.e. it is removably mounted so that it can be engaged or disengaged manually. Generally a medium-voltage switching kiosk has a hatch giving access to the fuses that enables an operator to disengage a blown fuse and replace it by engaging a new fuse. However during these manual operations of disengaging or engaging a fuse, the operator can be exposed to the risk of accident due to electric arcs. If a fuse is mounted in series with a vacuum-break switch, it is necessary for the switch to be open prior to the fuse being disengaged or engaged in order to prevent electric arcing.

Medium-voltage gear is known from U.S. Pat. No. 3,400,353 comprising a vacuum-break switch that can be mounted in series with a fuse. It is necessary for a door to be opened in order to access the fuse, the door being interlocked with the switch so that it can only be opened if the switch is open. A degree of safety is thus obtained by the device, providing the kiosk housing the gear is fitted with a door that is dimensioned so as to enable the operator to access the fuse.

OBJECT AND SUMMARY OF THE INVENTION

An object of the invention is to make it safe to handle such engageable current-limiting fuses that are placed in a medium-voltage switching kiosk substation provided with a vacuum-break switch and having access to the fuses that can be constituted by a relatively small opening made in the kiosk, e.g. a hatch.

Another object of the invention is to be able to act on the drive mechanism of the switch with a tool that can also be used by the operator to disengage a terminal of a fuse, e.g. constituted by an insulating pole.

To this end, the invention provides a safety device for medium-voltage electrical gear comprising an electric circuit having a current-limiting fuse or a plurality of fuses placed side by side and connected in parallel in the circuit, and a vacuum-break current switch connected in series with the fuse and, in the closed position, carrying the permanent current of the electric circuit, the switch having a pair of contacts one of which is movable relative to the other, and a drive mechanism for moving the moving contact to open or close the switch, the mechanism being arranged so as to prevent the fuse(s) being disengaged or engaged while the switch is closed. In the device, the drive mechanism comprises a drive lever occupying a first position when the switch is closed and a second position when the switch is open, and wherein each fuse has a handle member which is masked by the lever when the fuse is engaged and the lever is in its first position, or uncovered when the lever is in its second position, the lever being designed to cover the handle member so as to mask it.

As a result, the operator is obliged to open the switch before handling a fuse, thus preventing any risk of accident by means of an electric arc. A vacuum-break switch is used to ensure that no electric arcing occurs in the air inside the electrical gear.

In a particular embodiment of the safety device of the invention, a portion of the lever is U-shaped, and the handle member of each fuse is formed by an eyelet masked by said portion of the lever when it is inserted between the two branches of the U-shape.

The eyelet of a fuse can advantageously be formed in a flange fixed to the fuse, said flange forming a finger which comes into abutment against the lever to prevent the fuse being engaged if the lever is in its first position.

In another embodiment, the drive mechanism is arranged in a manner that ensures that the switch is opened or closed fully and that the travel speed of the moving contact is correct, independently of the drive provided by the operator.

BRIEF DESCRIPTION OF THE DRAWINGS

Other characteristics of the safety device of the invention appear better below.

MORE DETAILED DESCRIPTION

Figure 1:
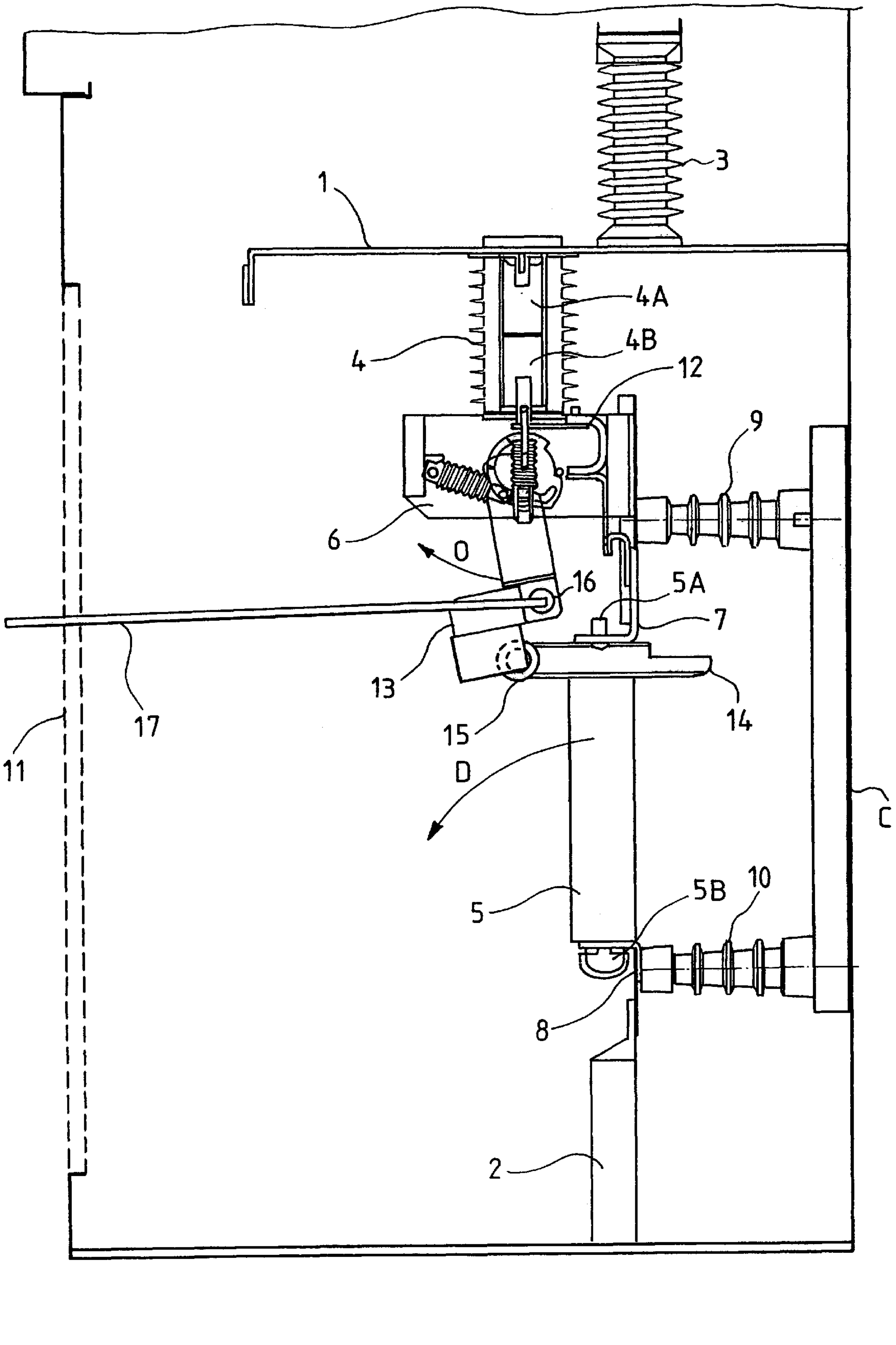
FIG. 1 is a fragmentary view of a medium-voltage switching kiosk in which a safety device of the invention is installed in association with a single fuse.

The medium-voltage switching kiosk shown in part in FIG. 1 has an electricity feed bar 1 which is connected, for example, to a circuit breaker that is not shown in FIG. 1.

The bar 1 is held horizontally beneath the roof of the kiosk by a supporting insulator 3 and it is connected to a cable 2 via an electric circuit comprising a switch 4 extending vertically beneath the bar 1 and a single engageable current-limiting fuse 5 which extends vertically beneath the switch 4. The fuse 5 and the switch 4 are connected in series in the electric circuit.

The switch 4 is preferably a vacuum-break switch having two contacts 4A and 4B, one of which (4B) is movable in translation relative to the other (4A).

The moving contact 4B of the switch 4 is driven by a manual drive mechanism 6 to open or close the switch 4.

The two end terminals 5A and 5B of the fuse 5 are engaged in resilient conducting clamps 7 and 8 that are spaced vertically apart from each other. The conductive clamps 7 and 8 are carried respectively by two supporting insulators 9, 10 that are fixed to a vertical partition C of the kiosk.

The clamps 7 and 8 are placed in such a manner as to enable the fuse 5 to be manually disengaged or engaged from an access hatch 11 to the kiosk which is situated facing the vertical partition C.

In the configuration of FIG. 1, the switch 4 is electrically connected to the bar 1 via its fixed contact 4A. The moving contact 4B of the switch is electrically connected to the terminal 5A of the fuse 5 via a flexible conductive metal braid 12 which is itself electrically connected to the conductive clamp 7 in which the terminal 5A of the fuse 5 is engaged. The conductive clamp 8 in which the terminal 5B of the fuse 5 is engaged is itself electrically connected to the cable 2.

To disengage the fuse 5 from the engaged position it is shown occupying in FIG. 1, the operator pulls the top terminal 5A of the fuse 5 towards the access hatch 11 so as to disengage it from the clamp 7 thus causing the fuse to pivot about its terminal 5B towards the access hatch 11 as shown by arrow D. While the fuse is pivoting, its bottom terminal 5B disengages from the conductive clamp 8 which is designed to enable the fuse to be held stably in a sloping position at the end of its angular stroke. Once the fuse has reached its stable position sloping towards the access hatch 11, the operator can extract it from the kiosk. To engage a fuse, the operator begins by placing the bottom terminal 5B of the fuse in the clamp 8, with the fuse sloping towards the access hatch 11, and then tilts the fuse towards the conductive clamp 7 so as to engage its terminal 5A. In order to be able to pivot the fuse 5 about its terminal 5B, it is possible, for example, to provide a cradle beneath the clamp 8 that forms a portion thereof and a ball joint at the end of the terminal 5B which is adapted to pivot in the cradle until it reaches an abutment position.

In the invention, the drive mechanism 6 for the moving contact 4B of the switch is arranged in such a manner as to prevent the fuse from being disengaged in the manner described above so long as the switch is closed, and also to prevent the fuse being engaged if the switch is closed.

More particularly, as can be seen in FIG. 1, the drive mechanism 6 has a drive lever 13 and the fuse has a flange 14 at its top end portion level with its top terminal 5A, the flange having an eyelet 15 forming a handle. The drive lever 13 also has an eyelet 16 forming a handle. In this case, the eyelets 15 and 16 lie in vertical planes perpendicular to the plane of the access hatch 11 and are adapted to receive a hook fixed to the end of an insulating pole 17 which is used by the operator to drive the mechanism 6 and to disengage the terminal 5A of the fuse from the clamp 7. More particularly, the lever 13 is arranged to pivot towards the access hatch 11 as shown by arrow O, this movement of the lever 13 causing the switch to open. Consequently, the operator opens the switch 4 by pulling the lever 13 towards the hatch by means of the pole 17 engaged in the eyelet 16. When the lever 13 is in a first position as shown in FIG. 1, corresponding to the switch 4 being in its closed position, and when a fuse is engaged as shown in FIG. 1, the lever 13 masks the eyelet 15 and as a result the operator cannot use the pole 17 to gain access to the eyelet 15 in order to disengage the fuse 5. This safety device thus obliges the operator to begin by opening the switch 4 prior to disengaging the fuse 5.

Figure 2:
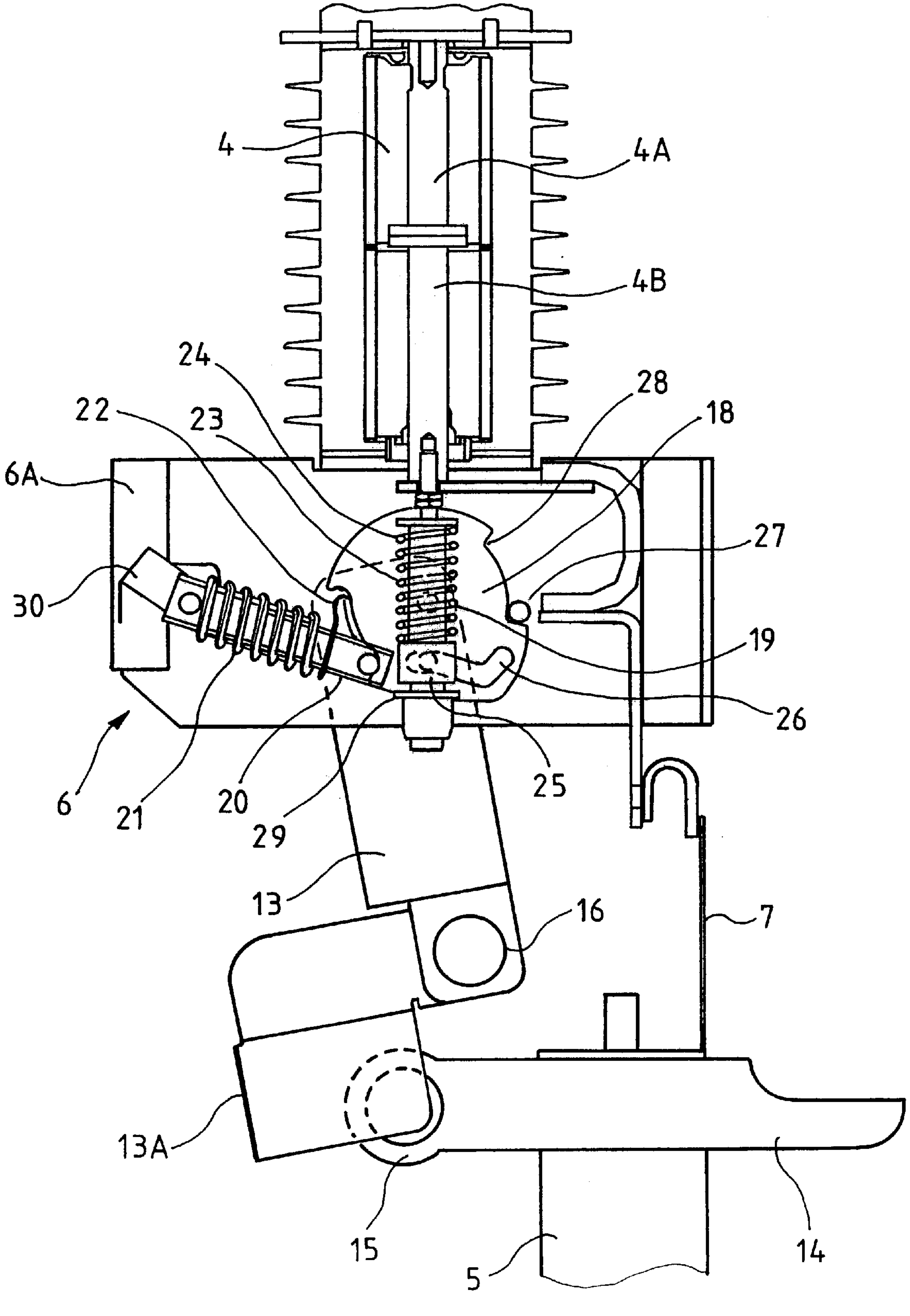
FIG. 2 shows the safety device when the switch is closed and the fuse is engaged.

FIG. 2 shows the safety device of the invention in greater detail. In FIG. 2, the switch is closed and the fuse is engaged. The lever 13 of the drive mechanism 6 has a terminal portion 13A that is U-shaped with two branches (only one being visible in FIG. 2) placed in two parallel vertical planes that are spaced apart from each other and on either side of the plane containing the eyelet 15. When the eyelet 15 is inserted between the two branches of the U, it is covered on both sides by the terminal portion 13A of the U-shape of the lever 13 and is inaccessible to the operator, thereby preventing the fuse from being disengaged.

The drive mechanism 6 has a cam 18 mounted to rotate freely about an axis 19 and coupled to the lever 13 and to the moving contact 4B of the switch so as to transform rotary movement of the lever 13 into translation movement of the moving contact 4B so as to open or close the switch 4.

The axis 19 is fixed to a plate 6A which extends vertically between the switch 4 and the fuse 5. The plate 6A is carried by a frame of the kiosk which is constituted in this case by the insulators 9, 10 and the vertical partition C of the kiosk.

The drive lever 13 is mounted to rotate about the axis 19 at its end remote from its end carrying the portion 13A, and the eyelet 16 is placed in the central zone of the lever 13 between the axis 19 and the portion 13A.

A telescopic arm 20 having a power coil spring 21 wound thereabout is hinged to rotate via its two ends on the plate 6A and on the lever 13. The end of the telescopic arm 20 hinged to the lever 13 is engaged in a first cam path 22 of the cam 18. This arm 20 and the spring 21 serve as a system for storing elastic energy to drive the cam 18 in rotation about the axis 19 to ensure that the switch 4 is opened or closed completely and that the travel speed of the moving contact 4B is determined independently of the drive provided by the operator.

An arm 23 having a second power spring 24 wound thereabout is mounted between the cam 18 and the drive rod for driving the moving contact 4B. The arm 23 extends vertically parallel to the travel direction of the moving contact 4B of the switch. The arm 23 has a top end secured to the drive rod of the moving contact 4B and a bottom end carrying a cross-member 25 which is engaged to slide in a second cam path 26 of the cam 18. The cam path 26 is a slot that is generally L-shaped. The cross-member 25 slides along the arm 23 and moves between the two ends of the cam path 26 when the cam 18 is rotated about the axis 19 in such a manner that rotation of the cam 18 in the clockwise direction causes the cross-member 25 to move the arm 23 downwards while rotation of the cam 18 in the counterclockwise direction causes the cross-member 25 to move the arm 23 upwards.

Finally, a peg 27 fixed to the plate 6A is located so as to move in a third cam path 28 of the cam 18, the cam path 28 being diametrically opposite the cam path 22 about the axis 19 and having two ends that act as abutments for the peg 27 so as to limit rotation of the cam 18 in both directions.

In FIG. 2, it can be seen that the hinge of the telescopic arm 20 on the lever 13 is disposed beneath the line interconnecting the axis 19 and the hinge of the arm 20 with the plate 6A. Furthermore, the hinge of the arm 20 on the lever 13 is placed in abutment against a first end of the cam path 22 while the peg 27 is placed in abutment against a first end of the cam path 28. Finally, the cross-member 25 is placed at a first end of the cam path 26 when the contacts 4A and 4B are closed.

Figure 3:
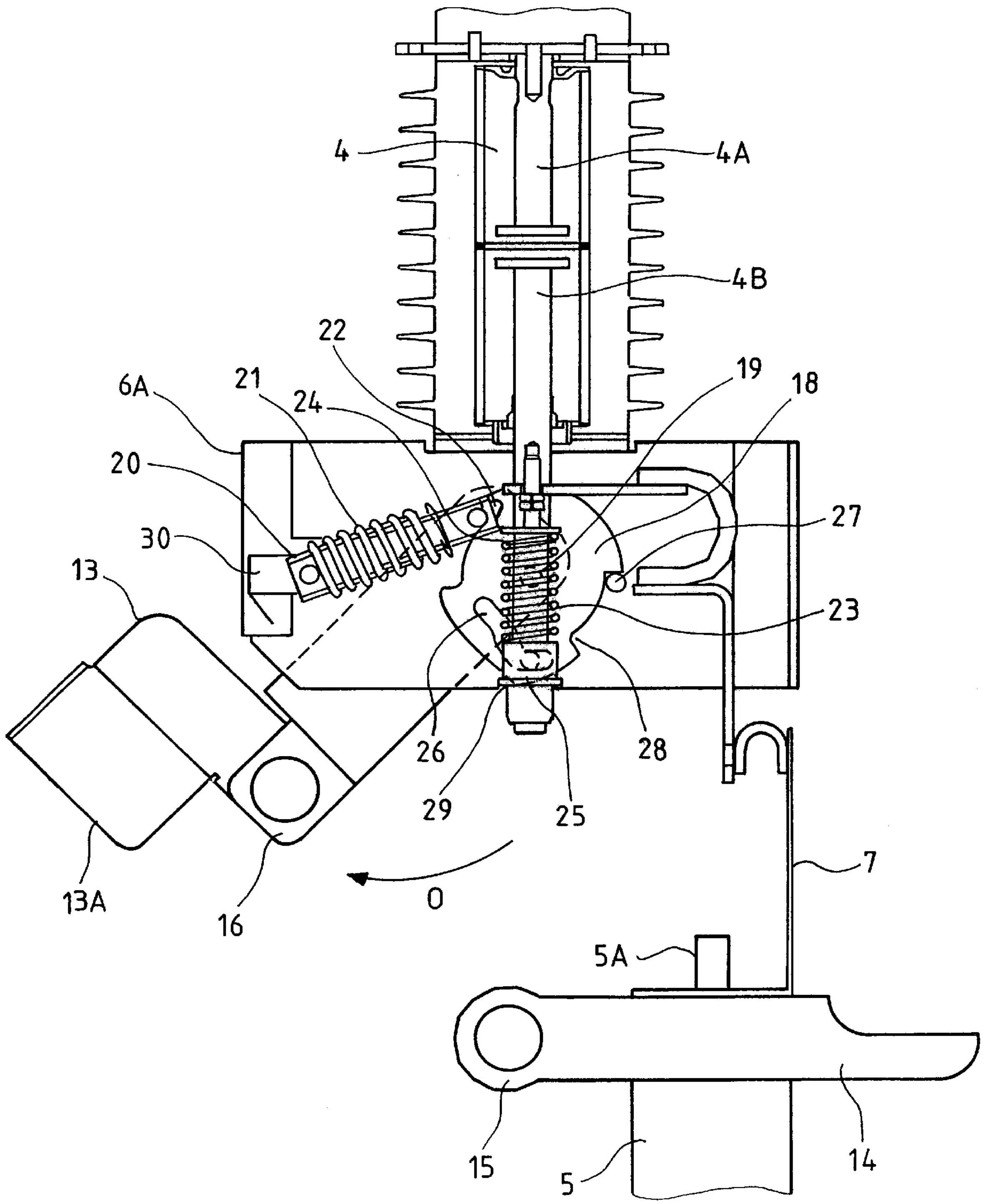
FIG. 3 shows the safety device when the switch is open and the fuse is engaged.

In FIG. 3, when the operator pulls the lever 13 towards the hatch 11 as represented by arrow O and using the pole 17 engaged in the eyelet 16, the lever 13 rotates about the axis 19 in the clockwise direction from its first position towards a second position as shown in FIG. 3, and corresponding to the switch 4 being open. When the lever 13 is in its second position, the portion 13A of the lever 13 uncovers the eyelet 15 of the fuse, and the hinge between the arm 20 and the lever 13 is placed above the line interconnecting the axis 19 and the hinge between the arm 20 and the plate 6A. The hinge between the arm 20 and the lever 13 is also placed in abutment against the second end of the cam path 22 while the peg 27 is placed in abutment against the second end of the cam path 28. Finally, the cross-member 25 is placed at the second end of the cam path 26. Rotation of the lever 13 in the clockwise direction from the first position towards the second position has caused the arm 20 to rotate about its hinge on the plate 6A and has caused the arm 20 to retract to a dead-center position of the arm 20 where the two hinges of the arm 20 and the axis 19 are in alignment in a substantially horizontal direction. Since the two ends of the spring 21 are secured respectively to the two ends of the arm 20, retraction of the arm 20 has loaded the spring 21 in compression until the arm 20 is in its dead-center position. When the arm 20 occupies its dead-center position, its hinge with the lever 13 comes into abutment against the second end of the cam path 22, and after going through this dead-center position, under the effect of subsequent rotation of the lever 13 in the clockwise direction, the spring 21 relaxes and lengthens the arm 20 which drives the cam 18 in rotation in the clockwise direction about the axis 19.

The rotation of the cam 18 in the clockwise direction is transformed into downward translation of the cross-member 25 along the arm 23 until the cross-member 25 comes into abutment against a washer 29 fixed to the bottom end of the arm 23. During rotation of the cam 18 in the clockwise direction, the cross-member 25 in abutment against the washer 29 follows the cam path 26 and moves the arm 23 downwards in translation, thereby moving the moving contact 4B in translation so as to separate it from the contact 4A. When the cross-member 25 comes into abutment against the washer 29, a small shock occurs which facilitates separating the contacts 4A and 4B. Rotation of the cam 18 in the clockwise direction is blocked when the peg 27 comes into abutment against the second end of the cam path 28 as can be seen in FIG. 3. Simultaneously, the cross-member 25 takes up a position at the second end of the cam path 26 in a portion of the cam which extends substantially horizontally so as to prevent vertical translation of the arm 23, thereby ensuring that the switch has an open position that is stable.

It will thus be understood that after the arm 20 has gone through the dead-center position, the switch opens automatically and independently of the drive applied by the operator to the lever 13. If the operator releases the lever 13 before the arm 20 has reached its dead-center position, then the switch returns to its closed position automatically.

As can be seen in FIGS. 2 and 3, the arm 20 has its end hinged on the plate 6A carrying a visible indicator 30 to inform the operator whether the switch 4 is in the open or the closed state. The visible indicator 30 is placed facing the access hatch 11 so as to be clearly visible for the operator. In this case it is constituted by a folded plate having two faces which are exposed selectively to the hatch 11 depending on the open or closed state of the switch 4.

Figure 4:
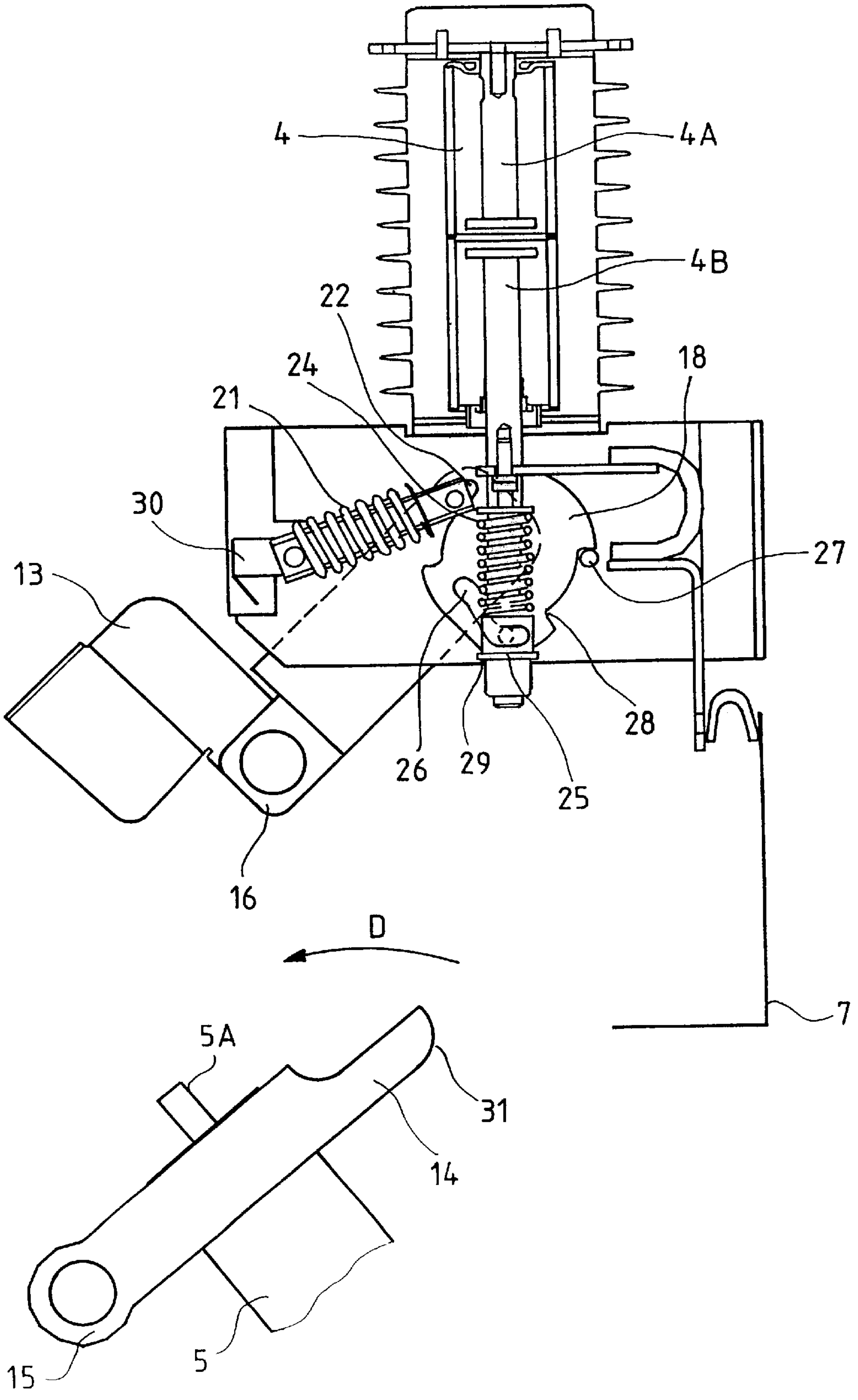
FIG. 4 shows the safety device when the switch is open and the fuse is disengaged.

In FIG. 4, the lever 13 is in its second position and the switch 4 is open. The fuse can then be tilted by the operator using the pole 17 as represented by arrow D so as to be disengaged and, where appropriate, replaced by another fuse which will in turn need to be engaged before the switch is reclosed.

Figure 5:
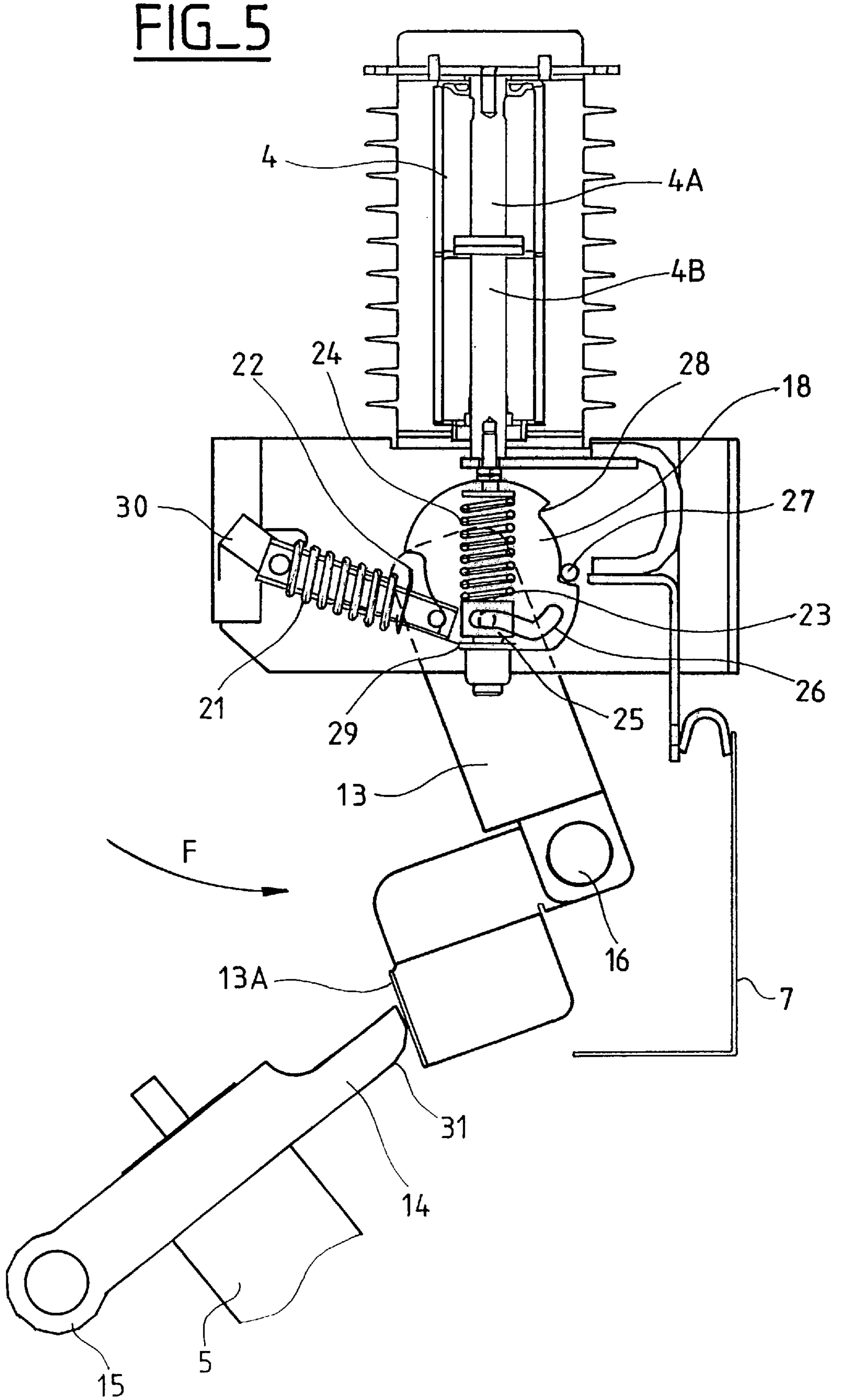
FIG. 5 shows the safety device when the switch is closed and the fuse is disengaged.

FIG. 5 shows the position of the lever 13 when the switch is closed but the fuse 5 has not yet been fully reengaged. To close the switch 4, the operator uses the pole 17 to push against the eyelet 16 as represented by arrow F so as to turn the lever 13 in the counter-clockwise direction from its second position to its first position. Rotation of the lever 13 causes the arm 20 to move so as to pass via its dead-center position in which the spring 21 is at maximum compression. After going past the dead-center position, the arm 20 rotates the cam 18 in the counterclockwise direction under drive from the spring 21 relaxing. The cam 18 rotates in the counterclockwise direction until the peg 27 comes into abutment against the first end of the cam path 28. Rotation of the cam 18 in the counterclockwise direction causes the cross-member 25 to move the arm 23 upwards. The subsequent displacement of the cross-member 25 in the cam path 26 under the effect of the cam 18 rotating in the counterclockwise direction causes the arm 23 to move in upward translation and closes the contacts 4A and 4B of the switch 4. When the switch 4 is fully closed, the cross-member 25 is at the first end of the cam path 26 in a portion of the cam that extends substantially horizontally so as to block vertical translation of the arm 23 and thus obtain a stable closed position for the switch. In addition, on the switch 4 closing, the spring 24 is put into compression against the arm 23 and the cross-member 25 so as to provide the necessary force for holding the moving contact 4B against the contact 4A.

As during opening, if the operator releases the lever 13 before the arm 20 has gone past its dead-center position, the switch 4 returns to its open position automatically. Once the lever 20 has gone through the dead-center position, the switch closes automatically and independently of the drive applied by the operator on the lever 13.

As can be seen in FIG. 4, the flange 14 fixed to the fuse 5 forms a kind of finger 31 which extends perpendicularly to the fuse 5 and behind the fuse 5, away form the eyelet 15. The finger 31 of the flange 14 comes into abutment against the U-shaped end portion 13A of the lever 13 occupying its first position, so that when the fuse is tilted towards the top clamp 7 the fuse 5 cannot be engaged while the switch is closed.

In the description above, the safety device of the invention is shown in its application to a single fuse. Nevertheless, the device can be adapted without difficulty to a medium-voltage switching kiosk in which an electricity feed bar is connected to an electricity distribution cable via a plurality of fuses placed side by side and connected in parallel in the circuit. It then suffices for the U-shaped end portion 13A of the lever 13 to be wide enough to mask all of the handle members 15 of the fuses when they are engaged, while the lever is in its first position.

Naturally, the flange 14 and the pole 17 are made of electrically insulating material.

What is claimed is:

1. A safety device for medium-voltage electrical gear comprising an electric circuit having a current-limiting fuse or a plurality of fuses placed side by side and connected in parallel in the circuit, and a vacuum-break current switch connected in series with the fuse and, in the closed position, carrying the permanent current of the electric circuit, said switch having a pair of contacts one of which is movable relative to the other, and a drive mechanism for moving the moving contact to open or close the switch, said mechanism being arranged so as to prevent the fuse(s) being disengaged or engaged while the switch is closed, wherein the drive mechanism comprises a drive lever occupying a first position when the switch is closed and a second position when the switch is open, and wherein each fuse has a handle member which is masked by the lever when the fuse is engaged and the lever is in its first position, or uncovered when the lever is in its second position, the lever being designed to cover the handle member so as to mask it.

2. The safety device according to claim 1, in which a portion of the lever is U-shaped, and in which the handle member of each fuse is formed by an eyelet masked by said portion of the lever when it is inserted between the two branches of the U-shape.

3. The safety device of claim 2, in which the eyelet of a fuse is formed in a flange fixed to the fuse, said flange forming a finger which comes into abutment against the lever to prevent the fuse being engaged if the lever is in its first position.

4. The safety device according to claim 1, in which the drive mechanism comprises a cam which is coupled to move with the lever and with the moving contact to transform rotary movement of the lever into movement in translation of the moving contact, and in which the drive mechanism further comprises a system for storing energy in a spring which is arranged in such a manner that displacement of the lever from its first position to its second position or vice versa causes the spring to be loaded so that when the spring relaxes after passing through a dead-center position it supplies rotary drive to the cam ensuring that the end of the opening or closing movement of the switch is achieved independently of the drive conditions applied by the operator.

5. The safety device according to claim 1, in which the drive mechanism includes a visible indicator for indicating the open or closed state of the switch.

6. An air insulated medium-voltage switching kiosk including a safety device according to claim 1.

7. An electric circuit for medium-voltage electrical gear used for safety, comprising:

a current-limiting fuse;

a vacuum-break current switch connected in series with the fuse, comprising a pair of contacts one of which is movable relative to the other; and a drive mechanism comprising a drive lever occupying a first position when the switch is closed and a second position when the switch is open by moving the moving contact to an open or closed position of the switch, wherein the switch is in the closed position, a permanent current is carried in the electric circuit and the driving mechanism prevents the fuse being disengaged or engaged, wherein the fuse has a handle member which is masked by the drive lever when the fuse is engaged and the drive lever is in the first position, or uncovered when the drive lever is in the second position, the drive lever being designed to cover the handle member so as to mask the handle member.

8. An electric circuit for medium-voltage electrical gear used for safety, comprising:

a current-limiting fuse;

a vacuum-break current switch connected in series with the fuse, comprising a pair of contacts one of which is movable relative to the other; and a drive mechanism comprising a drive lever occupying a first position when the switch is closed and a second position when the switch is open by moving the moving contact to an open or closed position of the switch, wherein the switch is in the closed position, a permanent current is carried in the electric circuit and the driving mechanism prevents the fuse being disengaged or engaged, wherein the fuse has a handle member which is masked by the drive lever when the fuse is engaged and the drive lever is in the first position, or uncovered when the drive lever is in the second position, the drive lever being designed to cover the handle member so as to mask the handle member, wherein the drive mechanism further comprises a cam coupled to move with the drive lever and with the moving contact to transform rotary movement of the drive lever into movement in translation of the moving contact.

9. The electric circuit for medium-voltage electrical gear used for safety according to claim 8, wherein the drive mechanism further comprises a system for storing energy in a spring which is arranged in such a manner that displacement of the drive lever from the first position to the second position or vice versa causes the spring to be loaded so that when the spring relaxes after passing through a dead-center position the spring supplies rotary drive to the cam ensuring that the end of the opening or closing movement of the switch is achieved independently of the drive conditions applied by the operator.

10. The safety device according to claim 7, in which the drive mechanism includes a visible indicator for indicating the open or closed state of the switch.

11. The safety device according to claim 8, in which a portion of the lever is U-shaped, and in which the handle member of each fuse is formed by an eyelet masked by the portion of the lever when the eyelet is inserted between the two branches of the U-shape.

* * * * *